United States Patent
Atanassov et al.

(10) Patent No.: US 10,013,764 B2
(45) Date of Patent: Jul. 3, 2018

(54) LOCAL ADAPTIVE HISTOGRAM EQUALIZATION

(71) Applicant: QUALCOMM Incorporated, San Diego, CA (US)

(72) Inventors: Kalin Mitkov Atanassov, San Diego, CA (US); James Wilson Nash, San Diego, CA (US); Stephen Michael Verrall, Carlsbad, CA (US); Hasib Ahmed Siddiqui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 14/309,458

(22) Filed: Jun. 19, 2014

(65) Prior Publication Data

US 2015/0371387 A1     Dec. 24, 2015

(51) Int. Cl.
*G06T 5/40*      (2006.01)
*G06T 19/20*     (2011.01)
(Continued)

(52) U.S. Cl.
CPC ............ *G06T 7/0028* (2013.01); *G06T 5/008* (2013.01); *G06T 5/40* (2013.01); *G06T 7/33* (2017.01);
(Continued)

(58) Field of Classification Search
CPC ........... G06T 19/20; G06T 2207/10012; G06T 2207/10024; G06T 2207/20021;
(Continued)

(56) References Cited

U.S. PATENT DOCUMENTS

| 3,698,803 A | 10/1972 | Watanuki |
| 4,114,171 A | 9/1978 | Altman |

(Continued)

FOREIGN PATENT DOCUMENTS

| CN | 101201459 A | 6/2008 |
| CN | 101571666 A | 11/2009 |

(Continued)

OTHER PUBLICATIONS

Han Y., et al., "Removing Illumination from Image Pair for Stereo Matching", Audio, Language and Image Processing (ICALIP), 2012 International Conference on, IEEE, Jul. 16, 2012, XP032278010, pp. 508-512.

(Continued)

*Primary Examiner* — Behrooz Senfi
(74) *Attorney, Agent, or Firm* — Paradice and Li LLP/Qualcomm

(57) ABSTRACT

Certain aspects relate to systems and techniques for performing local intensity equalization on images in a set of images exhibiting local intensity variations. For example, the local intensity equalization can be used to perform accurate region matching and alignment of the images. The images can be partitioned into regions of pixel blocks, for instance based on location, shape, and size of identified keypoints in the images. Regions depicting the same feature in the images can be equalized with respect to intensity. Region matching based on the keypoints in the intensity-equalized regions can be performed with accuracy even in images captured by asymmetric sensors or exhibiting spatially varying intensity.

30 Claims, 5 Drawing Sheets

(51) Int. Cl.
*G06T 7/00* (2017.01)
*H04N 5/232* (2006.01)
*H04N 13/02* (2006.01)
*G06T 5/00* (2006.01)
*G06T 7/33* (2017.01)
*G06T 7/593* (2017.01)

(52) U.S. Cl.
CPC .............. *G06T 7/593* (2017.01); *G06T 19/20* (2013.01); *H04N 5/23229* (2013.01); *H04N 13/0239* (2013.01); *H04N 13/0257* (2013.01); *G06T 2207/10012* (2013.01); *G06T 2207/10024* (2013.01); *G06T 2207/10048* (2013.01); *G06T 2207/20021* (2013.01)

(58) Field of Classification Search
CPC ......... G06T 5/008; G06T 5/40; G06T 7/0028; G06T 7/408; H04N 13/0239; H04N 13/0257; H04N 5/23229
USPC ............................................. 348/49; 382/162
See application file for complete search history.

(56) References Cited

U.S. PATENT DOCUMENTS

| | | | |
|---|---|---|---|
| 4,437,745 A | 3/1984 | Hajnal | |
| 4,639,586 A | 1/1987 | Fender et al. | |
| 4,740,780 A | 4/1988 | Brown et al. | |
| 4,751,570 A | 6/1988 | Robinson | |
| 5,012,273 A | 4/1991 | Nakamura et al. | |
| 5,016,109 A | 5/1991 | Gaylord | |
| 5,063,441 A | 11/1991 | Lipton et al. | |
| 5,142,357 A | 8/1992 | Lipton et al. | |
| 5,194,959 A | 3/1993 | Kaneko et al. | |
| 5,207,000 A | 5/1993 | Chang et al. | |
| 5,231,461 A | 7/1993 | Silvergate et al. | |
| 5,243,413 A | 9/1993 | Gitlin et al. | |
| 5,313,542 A | 5/1994 | Castonguay | |
| 5,475,617 A | 12/1995 | Castonguay | |
| 5,506,913 A | 4/1996 | Ibison et al. | |
| 5,539,483 A | 7/1996 | Nalwa | |
| 5,606,627 A | 2/1997 | Kuo | |
| 5,614,941 A | 3/1997 | Hines | |
| 5,640,222 A | 6/1997 | Paul | |
| 5,642,299 A | 6/1997 | Hardin et al. | |
| 5,686,960 A | 11/1997 | Sussman et al. | |
| 5,721,585 A | 2/1998 | Keast et al. | |
| 5,734,507 A | 3/1998 | Harvey | |
| 5,745,305 A | 4/1998 | Nalwa | |
| 5,760,846 A | 6/1998 | Lee | |
| 5,793,527 A | 8/1998 | Nalwa | |
| 5,798,791 A | 8/1998 | Katayama et al. | |
| 5,903,306 A | 5/1999 | Heckendorn et al. | |
| 5,926,411 A | 7/1999 | Russell | |
| 5,990,934 A | 11/1999 | Nalwa | |
| 6,111,702 A | 8/2000 | Nalwa | |
| 6,115,176 A | 9/2000 | Nalwa | |
| 6,128,143 A | 10/2000 | Nalwa | |
| 6,141,034 A | 10/2000 | McCutchen | |
| 6,141,145 A | 10/2000 | Nalwa | |
| 6,144,501 A | 11/2000 | Nalwa | |
| 6,195,204 B1 | 2/2001 | Nalwa | |
| 6,219,090 B1 | 4/2001 | Nalwa | |
| 6,285,365 B1 | 9/2001 | Nalwa | |
| 6,356,397 B1 | 3/2002 | Nalwa | |
| 6,421,185 B1 | 7/2002 | Wick et al. | |
| 6,611,289 B1 | 8/2003 | Yu et al. | |
| 6,628,897 B2 | 9/2003 | Suzuki | |
| 6,650,774 B1 | 11/2003 | Szeliski | |
| 6,700,711 B2 | 3/2004 | Nalwa | |
| 6,701,081 B1 | 3/2004 | Dwyer et al. | |
| 6,768,509 B1 | 7/2004 | Bradski et al. | |
| 6,775,437 B2 | 8/2004 | Kazarinov et al. | |
| 6,782,137 B1* | 8/2004 | Avinash | G06T 5/004 345/617 |
| 6,798,406 B1 | 9/2004 | Jones et al. | |
| 6,809,887 B1 | 10/2004 | Gao et al. | |
| 6,850,279 B1 | 2/2005 | Scherling | |
| 6,855,111 B2 | 2/2005 | Yokoi et al. | |
| 6,861,633 B2 | 3/2005 | Osborn | |
| 6,862,364 B1* | 3/2005 | Berestov | G06T 5/008 345/426 |
| 6,987,534 B1* | 1/2006 | Seta | G01S 11/12 348/229.1 |
| 6,992,700 B1 | 1/2006 | Sato et al. | |
| 7,006,123 B2 | 2/2006 | Yoshikawa et al. | |
| 7,039,292 B1 | 5/2006 | Breiholz | |
| 7,084,904 B2 | 8/2006 | Liu et al. | |
| 7,116,351 B2 | 10/2006 | Yoshikawa | |
| 7,215,479 B1 | 5/2007 | Bakin | |
| 7,253,394 B2 | 8/2007 | Kang | |
| 7,271,803 B2 | 9/2007 | Ejiri et al. | |
| 7,336,299 B2 | 2/2008 | Kostrzewski et al. | |
| 7,612,953 B2 | 11/2009 | Nagai et al. | |
| 7,710,463 B2 | 5/2010 | Foote | |
| 7,805,071 B2 | 9/2010 | Mitani | |
| 7,817,354 B2 | 10/2010 | Wilson | |
| 7,860,214 B1* | 12/2010 | Haff | G01N 23/06 378/57 |
| 7,893,957 B2 | 2/2011 | Peters et al. | |
| 7,961,398 B2 | 6/2011 | Tocci | |
| 7,978,222 B2 | 7/2011 | Schneider | |
| 8,004,557 B2 | 8/2011 | Pan | |
| 8,098,276 B2 | 1/2012 | Chang et al. | |
| 8,115,813 B2 | 2/2012 | Tang | |
| 8,139,125 B2 | 3/2012 | Scherling | |
| 8,228,417 B1 | 7/2012 | Georgiev et al. | |
| 8,267,601 B2 | 9/2012 | Campbell et al. | |
| 8,284,263 B2 | 10/2012 | Oohara et al. | |
| 8,294,073 B1 | 10/2012 | Vance et al. | |
| 8,356,035 B1 | 1/2013 | Baluja et al. | |
| 8,400,555 B1 | 3/2013 | Georgiev et al. | |
| 8,442,392 B2 | 5/2013 | Ollila et al. | |
| 8,482,813 B2 | 7/2013 | Kawano et al. | |
| 8,791,984 B2 | 7/2014 | Jones et al. | |
| 8,836,693 B2 | 9/2014 | Katano | |
| 8,928,988 B1 | 1/2015 | Ford et al. | |
| 8,988,564 B2 | 3/2015 | Webster et al. | |
| 9,049,375 B2 | 6/2015 | Wade et al. | |
| 9,055,208 B2 | 6/2015 | Kim | |
| 9,185,296 B2 | 11/2015 | Wade et al. | |
| 9,264,610 B2 | 2/2016 | Duparre | |
| 9,294,672 B2 | 3/2016 | Georgiev et al. | |
| 9,316,810 B2 | 4/2016 | Mercado | |
| 9,332,188 B2 | 5/2016 | Takei et al. | |
| 9,386,222 B2 | 7/2016 | Georgiev et al. | |
| 9,602,806 B1 | 3/2017 | Stafford et al. | |
| 9,609,210 B2 | 3/2017 | Djordjevic et al. | |
| 2001/0028482 A1 | 10/2001 | Nishioka | |
| 2002/0070365 A1 | 6/2002 | Karellas | |
| 2002/0136150 A1 | 9/2002 | Mihara et al. | |
| 2003/0024987 A1 | 2/2003 | Zhu | |
| 2003/0034395 A1 | 2/2003 | Tsikos et al. | |
| 2003/0038814 A1 | 2/2003 | Blume | |
| 2003/0214575 A1 | 11/2003 | Yoshikawa | |
| 2004/0021767 A1 | 2/2004 | Endo et al. | |
| 2004/0051805 A1 | 3/2004 | Yoshikawa et al. | |
| 2004/0066449 A1 | 4/2004 | Givon | |
| 2004/0105025 A1 | 6/2004 | Scherling | |
| 2004/0183907 A1 | 9/2004 | Hovanky et al. | |
| 2004/0195492 A1 | 10/2004 | Hsin | |
| 2004/0201769 A1 | 10/2004 | Yoshikawa et al. | |
| 2004/0246333 A1 | 12/2004 | Steuart et al. | |
| 2004/0263611 A1 | 12/2004 | Cutler | |
| 2005/0053274 A1 | 3/2005 | Mayer et al. | |
| 2005/0057659 A1 | 3/2005 | Hasegawa | |
| 2005/0081629 A1 | 4/2005 | Hoshal | |
| 2005/0111106 A1 | 5/2005 | Matsumoto et al. | |
| 2005/0185711 A1 | 8/2005 | Pfister et al. | |
| 2005/0218297 A1 | 10/2005 | Suda et al. | |
| 2005/0243175 A1* | 11/2005 | Yamada | H04N 5/2354 348/207.1 |
| 2006/0023074 A1 | 2/2006 | Cutler | |
| 2006/0023106 A1 | 2/2006 | Yee et al. | |

(56) References Cited

U.S. PATENT DOCUMENTS

| | | |
|---|---|---|
| 2006/0023278 A1 | 2/2006 | Nishioka |
| 2006/0061660 A1 | 3/2006 | Brackmann |
| 2006/0098267 A1 | 5/2006 | Togawa |
| 2006/0140446 A1 | 6/2006 | Luo et al. |
| 2006/0193509 A1 | 8/2006 | Criminisi et al. |
| 2006/0215054 A1 | 9/2006 | Liang et al. |
| 2006/0215903 A1 | 9/2006 | Nishiyama |
| 2006/0238441 A1 | 10/2006 | Benjamin et al. |
| 2007/0024739 A1 | 2/2007 | Konno |
| 2007/0058961 A1 | 3/2007 | Kobayashi et al. |
| 2007/0064142 A1 | 3/2007 | Misawa et al. |
| 2007/0085903 A1 | 4/2007 | Zhang |
| 2007/0146530 A1 | 6/2007 | Nose |
| 2007/0164202 A1 | 7/2007 | Wurz et al. |
| 2007/0216796 A1 | 9/2007 | Lenel et al. |
| 2007/0242152 A1 | 10/2007 | Chen |
| 2007/0263115 A1 | 11/2007 | Horidan et al. |
| 2007/0268983 A1 | 11/2007 | Elam |
| 2008/0029708 A1 | 2/2008 | Olsen et al. |
| 2008/0030597 A1 | 2/2008 | Olsen et al. |
| 2008/0058629 A1 | 3/2008 | Seibel et al. |
| 2008/0088702 A1 | 4/2008 | Linsenmaier et al. |
| 2008/0117289 A1 | 5/2008 | Schowengerdt et al. |
| 2008/0117532 A1 | 5/2008 | Shafer |
| 2008/0218612 A1 | 9/2008 | Border et al. |
| 2008/0259172 A1 | 10/2008 | Tamaru |
| 2008/0266404 A1 | 10/2008 | Sato |
| 2008/0290435 A1 | 11/2008 | Oliver et al. |
| 2008/0291543 A1 | 11/2008 | Nomura et al. |
| 2008/0297612 A1 | 12/2008 | Yoshikawa |
| 2008/0316301 A1 | 12/2008 | Givon |
| 2009/0003646 A1 | 1/2009 | Au et al. |
| 2009/0005112 A1 | 1/2009 | Sorek et al. |
| 2009/0015812 A1 | 1/2009 | Schultz et al. |
| 2009/0051804 A1 | 2/2009 | Nomura et al. |
| 2009/0080695 A1 | 3/2009 | Yang |
| 2009/0085846 A1 | 4/2009 | Cho et al. |
| 2009/0096994 A1 | 4/2009 | Smits |
| 2009/0153726 A1 | 6/2009 | Lim |
| 2009/0160931 A1 | 6/2009 | Pockett et al. |
| 2009/0219402 A1 | 9/2009 | Schneider |
| 2009/0268210 A1 | 10/2009 | Prince |
| 2009/0268983 A1 | 10/2009 | Stone et al. |
| 2009/0268985 A1 | 10/2009 | Wong et al. |
| 2009/0296984 A1* | 12/2009 | Nijim ............... G06T 7/0065 |
| | | 382/103 |
| 2009/0315808 A1 | 12/2009 | Ishii |
| 2010/0044555 A1 | 2/2010 | Ohara et al. |
| 2010/0045774 A1 | 2/2010 | Len et al. |
| 2010/0066812 A1 | 3/2010 | Kajihara et al. |
| 2010/0165155 A1 | 7/2010 | Chang |
| 2010/0202766 A1 | 8/2010 | Takizawa et al. |
| 2010/0215249 A1 | 8/2010 | Heitz et al. |
| 2010/0232681 A1 | 9/2010 | Fujieda et al. |
| 2010/0259655 A1 | 10/2010 | Takayama |
| 2010/0265313 A1 | 10/2010 | Liu et al. |
| 2010/0265363 A1 | 10/2010 | Kim |
| 2010/0278423 A1 | 11/2010 | Itoh et al. |
| 2010/0289878 A1 | 11/2010 | Sato et al. |
| 2010/0290703 A1* | 11/2010 | Sim .................. G06T 5/008 |
| | | 382/172 |
| 2010/0290769 A1 | 11/2010 | Nasiri et al. |
| 2010/0302396 A1 | 12/2010 | Golub et al. |
| 2010/0309286 A1 | 12/2010 | Chen et al. |
| 2010/0309333 A1 | 12/2010 | Smith et al. |
| 2011/0001789 A1 | 1/2011 | Wilson et al. |
| 2011/0007135 A1 | 1/2011 | Okada et al. |
| 2011/0009163 A1 | 1/2011 | Fletcher et al. |
| 2011/0012998 A1 | 1/2011 | Pan |
| 2011/0038535 A1* | 2/2011 | Wang .................. H04N 9/735 |
| | | 382/164 |
| 2011/0043623 A1 | 2/2011 | Fukuta et al. |
| 2011/0090575 A1 | 4/2011 | Mori |
| 2011/0096089 A1 | 4/2011 | Shenhav et al. |
| 2011/0096988 A1 | 4/2011 | Suen et al. |
| 2011/0128412 A1 | 6/2011 | Milnes et al. |
| 2011/0150442 A1 | 6/2011 | Ollila et al. |
| 2011/0181588 A1 | 7/2011 | Barenbrug et al. |
| 2011/0213664 A1 | 9/2011 | Osterhout et al. |
| 2011/0235899 A1 | 9/2011 | Tanaka |
| 2011/0249341 A1 | 10/2011 | Difrancesco et al. |
| 2011/0262122 A1 | 10/2011 | Minamisawa et al. |
| 2011/0304764 A1 | 12/2011 | Shigemitsu et al. |
| 2012/0008148 A1 | 1/2012 | Pryce et al. |
| 2012/0033051 A1 | 2/2012 | Atanassov et al. |
| 2012/0044368 A1 | 2/2012 | Lin et al. |
| 2012/0056987 A1 | 3/2012 | Fedoroff |
| 2012/0075168 A1 | 3/2012 | Osterhout et al. |
| 2012/0229688 A1 | 9/2012 | Tajiri |
| 2012/0249750 A1 | 10/2012 | Izzat et al. |
| 2012/0249815 A1 | 10/2012 | Bohn et al. |
| 2012/0269400 A1 | 10/2012 | Heyward |
| 2012/0281072 A1 | 11/2012 | Georgiev et al. |
| 2012/0293607 A1 | 11/2012 | Bhogal et al. |
| 2012/0293632 A1 | 11/2012 | Yukich |
| 2012/0327195 A1 | 12/2012 | Cheng |
| 2013/0003140 A1 | 1/2013 | Keniston et al. |
| 2013/0010084 A1 | 1/2013 | Hatano |
| 2013/0038689 A1 | 2/2013 | McDowall |
| 2013/0070055 A1 | 3/2013 | Atanassov et al. |
| 2013/0076924 A1 | 3/2013 | Wade et al. |
| 2013/0077945 A1 | 3/2013 | Liu et al. |
| 2013/0100304 A1 | 4/2013 | Wade et al. |
| 2013/0128030 A1 | 5/2013 | Georgiev |
| 2013/0141802 A1 | 6/2013 | Yang |
| 2013/0182325 A1 | 7/2013 | Minamisawa et al. |
| 2013/0222556 A1 | 8/2013 | Shimada |
| 2013/0229529 A1 | 9/2013 | Lablans |
| 2013/0250045 A1 | 9/2013 | Ki et al. |
| 2013/0250053 A1 | 9/2013 | Levy |
| 2013/0250123 A1* | 9/2013 | Zhang .................. G06T 7/0028 |
| | | 348/164 |
| 2013/0260823 A1 | 10/2013 | Shukla et al. |
| 2013/0278785 A1 | 10/2013 | Nomura et al. |
| 2013/0286451 A1 | 10/2013 | Verhaegh |
| 2013/0329015 A1 | 12/2013 | Pulli et al. |
| 2013/0335598 A1 | 12/2013 | Gustavsson et al. |
| 2013/0335600 A1 | 12/2013 | Gustavsson et al. |
| 2014/0009631 A1 | 1/2014 | Topliss |
| 2014/0016832 A1* | 1/2014 | Kong .................. A61B 5/02007 |
| | | 382/115 |
| 2014/0085502 A1* | 3/2014 | Lin ..................... H04N 5/2258 |
| | | 348/223.1 |
| 2014/0104378 A1 | 4/2014 | Kauff et al. |
| 2014/0111650 A1 | 4/2014 | Georgiev et al. |
| 2014/0139623 A1 | 5/2014 | McCain et al. |
| 2014/0139693 A1 | 5/2014 | Takei et al. |
| 2014/0152852 A1 | 6/2014 | Ito et al. |
| 2014/0184749 A1 | 7/2014 | Hilliges et al. |
| 2014/0192253 A1 | 7/2014 | Laroia |
| 2014/0285673 A1* | 9/2014 | Hundley ............ G06K 9/00657 |
| | | 348/164 |
| 2015/0043076 A1 | 2/2015 | Nakayama |
| 2015/0049172 A1 | 2/2015 | Ramachandra et al. |
| 2015/0070562 A1* | 3/2015 | Nayar ............... H01L 27/14621 |
| | | 348/336 |
| 2015/0085363 A1 | 3/2015 | Liu et al. |
| 2015/0125092 A1* | 5/2015 | Zhuo ................... G06T 7/004 |
| | | 382/275 |
| 2015/0177524 A1 | 6/2015 | Webster et al. |
| 2015/0201128 A1 | 7/2015 | Dong |
| 2015/0244934 A1 | 8/2015 | Duparre et al. |
| 2015/0253647 A1 | 9/2015 | Mercado |
| 2015/0286033 A1 | 10/2015 | Osborne |
| 2015/0288865 A1 | 10/2015 | Osborne |
| 2015/0370040 A1 | 12/2015 | Georgiev |
| 2015/0373252 A1 | 12/2015 | Georgiev |
| 2015/0373268 A1 | 12/2015 | Osborne |
| 2015/0373269 A1 | 12/2015 | Osborne |
| 2015/0373279 A1 | 12/2015 | Osborne |
| 2016/0014332 A1 | 1/2016 | De et al. |
| 2016/0085059 A1 | 3/2016 | Mercado |
| 2016/0127641 A1 | 5/2016 | Gove |
| 2016/0127646 A1 | 5/2016 | Osborne |

(56) References Cited

U.S. PATENT DOCUMENTS

| | | | |
|---|---|---|---|
| 2016/0198087 | A1 | 7/2016 | Georgiev et al. |
| 2016/0269602 | A1 | 9/2016 | Osborne |
| 2016/0286121 | A1 | 9/2016 | Georgiev et al. |
| 2016/0295112 | A1 | 10/2016 | Georgiev et al. |
| 2016/0353008 | A1 | 12/2016 | Osborne |
| 2016/0373263 | A1 | 12/2016 | Zaidi et al. |
| 2017/0026570 | A1 | 1/2017 | Shepard et al. |
| 2017/0038502 | A1 | 2/2017 | Georgiev |
| 2017/0118421 | A1 | 4/2017 | Georgiev |

FOREIGN PATENT DOCUMENTS

| | | |
|---|---|---|
| CN | 101581828 A | 11/2009 |
| CN | 101867720 A | 10/2010 |
| CN | 101902657 A | 12/2010 |
| CN | 202405984 U | 8/2012 |
| EP | 0610605 A1 | 8/1994 |
| EP | 0751416 A1 | 1/1997 |
| EP | 1176812 A1 | 1/2002 |
| EP | 1383342 A2 | 1/2004 |
| EP | 1816514 A1 | 8/2007 |
| EP | 1832912 A2 | 9/2007 |
| EP | 2242252 A2 | 10/2010 |
| GB | 2354390 A | 3/2001 |
| GB | 2354391 A | 3/2001 |
| JP | H06217184 A | 8/1994 |
| JP | H06251127 A | 9/1994 |
| JP | H089424 A | 1/1996 |
| JP | H0847001 A | 2/1996 |
| JP | H08125835 A | 5/1996 |
| JP | 8194274 A | 7/1996 |
| JP | H08242453 A | 9/1996 |
| JP | H10142490 A | 5/1998 |
| JP | 2001194114 A | 7/2001 |
| JP | 2003304561 A | 10/2003 |
| JP | 3791847 B1 | 6/2006 |
| JP | 2006279538 A | 10/2006 |
| JP | 2007147457 A | 6/2007 |
| JP | 2007323615 A | 12/2007 |
| JP | 2008009424 A | 1/2008 |
| JP | 2009122842 A | 6/2009 |
| JP | 2010041381 A | 2/2010 |
| JP | 2010067014 A | 3/2010 |
| JP | 2010128820 A | 6/2010 |
| JP | 2010524279 A | 7/2010 |
| KR | 20080071400 A | 8/2008 |
| WO | WO-9321560 A1 | 10/1993 |
| WO | WO-9847291 A2 | 10/1998 |
| WO | WO-2006075528 A1 | 7/2006 |
| WO | WO-2007129147 A1 | 11/2007 |
| WO | WO-2008112054 A1 | 9/2008 |
| WO | WO-2009047681 A1 | 4/2009 |
| WO | WO-2009086330 A2 | 7/2009 |
| WO | WO-2010019757 A1 | 2/2010 |
| WO | WO-2012136388 A1 | 10/2012 |
| WO | WO-2012164339 A1 | 12/2012 |
| WO | WO-2013154433 A1 | 10/2013 |
| WO | WO-2014012603 A1 | 1/2014 |
| WO | WO-2014025588 A1 | 2/2014 |

OTHER PUBLICATIONS

International Search Report and Written Opinion—PCT/US2015/033685—ISA/EPO—Sep. 17, 2015.

RICOH Imagine Change: "New RICOH THETA Model, Capturing 360-degree Images in One Shot, is on Sale Soon—Spherical Video Function, API and SDK (Beta Version)", News Release, Oct. 28, 2014, 3 pages.

Shuchun Y., et al., "Preprocessing for stereo vision based on LOG filter", Proceedings of 2011 6th International Forum on Strategic Technology, Aug. 2011, XP055211077, pp. 1074-1077.

Arican, et al., "Intermediate View Generation for Perceived Depth Adjustment of Sterio Video", Mitsubishi Electric Research Laboratories, http://www.merl.com, TR2009-052, Sep. 2009; 12 pages.

Hoff, et al., "Surfaces from Stereo: Integrating Feature Matching, Disparity Estimation, and Contour Detection", IEEE Transactions on Pattern Analysis and Machine Intelligence, vol. 11, No. 2, pp. 121-136, Feb. 1989.

Murphy M., et al., "Lens Drivers Focus on Performance in High-Resolution Camera Modules," Analog Dialogue, Nov. 2006, vol. 40, pp. 1-3.

Narkhede, et al., "Stereoscopic Imaging: A Real-Time, In Depth Look," IEEE Potentials, Feb./Mar. 2004, vol. 23, Issue 1, pp. 38-42.

Sun W.S., et al., "Single-Lens Camera Based on a Pyramid Prism Array to Capture Four Images," Optical Review, 2013, vol. 20 (2), pp. 145-152.

Krotkov E., et al., "Active vision for reliable ranging: Cooperating focus, stereo, and vergence", International Journal of Computer Vision. vol. 11, No. 2, Oct. 1, 1993 (Oct. 1, 1993), pp. 187-203, XP055149875, ISSN: 0920-5691. DOI: 10.1007/BF01469228.

Hao M., et al., "Object Location Technique for Binocular Stereo Vision Based on Scale Invariant Feature Transform Feature Points", SIFT, Journal of Harbin Engineering University, Jun. 2009, vol. 30, No. 6 pp. 649-653.

Kawanishi T., et al., "Generation of High-Resolution Stereo Panoramic Images by Omnidirectional Imaging Sensor Using Hexagonal Pyramidal Mirrors", Pattern Recognition, 1998, Proceedings, Fourteenth International Conference on Brisbane, QLD., Australia Aug. 16-20, 1998, Los Alamitos, CA, USA,IEEE Comput. Soc, US, Jan. 1, 1998 (Jan. 1, 1998), pp. 485-489, vol. 1, XP031098377, ISBN: 978-0-8186-8512-5.

Tan K-H., et al., "Multiview Panoramic Cameras Using a Pyramid", Omnidirectional Vision, 2002, Proceedings, Third Workshop on Jun. 2, 2002, Piscataway, NJ, USA,IEEE, Jan. 1, 2002 (Jan. 1, 2002), pp. 87-93, XP010611080, ISBN: 978-0-7695-1629-5.

Hua et al., "Design Analysis of a High-Resolution Panoramic Camera Using Conventional Imagers and a Mirror Pyramid," IEEE Transactions on Pattern Analysis and Machine Intelligence; Feb. 2007; 29(2):356-361.

Meng et al., "Single-shot Specular Surface Reconstruction with Gonio-plenoptic Imaging," 2015 IEEE International Conference on Computer Vision; pp. 3433-3441.

Chowdhury a., et al., "Challenges of Megapixel Camera Module Assembly and Test," Electronic Components and Technology Conference, 2005, pp. 1390-1401.

\* cited by examiner

LOCAL ADAPTIVE HISTOGRAM EQUALIZATION

TECHNICAL FIELD

The systems and methods disclosed herein are directed to image processing, and, more particularly, to local intensity equalization in region matching techniques.

BACKGROUND

Image registration, or image alignment, is the process of transforming different sets of image data into one coordinate system. The image data includes multiple images such as images from different image sensors, times, depths, viewpoints, or portions of the light spectrum. Image alignment is used in photography, computer vision, medical imaging, and compiling and analyzing images and data from telescopes and satellites, among other applications. Image alignment is used in order to be able to compare or integrate the image data obtained from these different optical measurements. Typically, image alignment occurs through intensity-based methods by comparing intensity patterns in the images via correlation metrics, or by feature-based methods by finding correspondences between image features such as points, lines, and contours. Image alignment can be accomplished at the level of pixel-by-pixel alignment, region-based registration or global registration.

One type of image alignment is stereo matching, which is used to create an illusion of depth when presenting a set of two offset images. Stereo matching is the process of determining correspondences between objects in related images, for example two images of the same image scene captured from different viewpoints. Correspondences can refer to matching points which show the same position in the image scene in both stereo images. That is, matching points represent the same portion of an object that is depicted in both stereo images. Often, determining correspondences is treated as two quite independent sub-processes, namely, segmentation, followed by matching. An image can be segmented into regions based on pixel values, for example color values or intensity values. Regions are considered as the primitives to be matched between a corresponding pair of images, since many of the shortcomings inherent in approaches based on points or lines can be overcome by matching more developed entities. The correspondences can be used for calculating the depth to an object of interest according to the principle of triangulation by using the disparity between the matching points.

SUMMARY

In general, this disclosure is related to systems and techniques for local intensity equalization for image alignment techniques or processing. For example, one implementation the process can segment image data including two or more images into regions including blocks of pixels. In some embodiments, the regions can correspond to identified features in the image data. In some embodiments such as stereoscopic alignment applications, the pixel blocks can be sized such that the block size is greater than a maximum disparity value and less than a roll-off variation. Local histogram matching can be performed on each block followed by bilinear interpolation between blocks, resulting in equalized intensity variation across the images. The equalized intensity variation can produce more accurate region matching results compared to non-intensity-matched image sets.

In some embodiments, the local intensity equalization process can enable accurate region matching across asymmetric sensors, such as may be implemented in stereoscopic, panoramic, or multispectral imaging systems. For example, many stereoscopic imaging systems implement multiple image sensors at different locations to capture different views of the target image scene to generate a stereoscopic image set. These multiple image sensors may not be matched with respect to gains, roll-offs, sensitivity, field of view, white balance, geometric distortion, and noise sensitivities, among other things, producing variations in intensity at corresponding features in the captured images. Variations in the lenses or optical elements that are used to focus light onto the sensors can also produce variations in intensity at corresponding features. As well, discrepancies in on-board image signal conditioning can also contribute to variations in intensity at corresponding features. Such sensors are referred to herein as "asymmetric sensors" for their varying responses to intensity of light incoming from features of the image scene.

As another example, some multispectral imaging systems implement multiple sensors to capture image data at different portions of the electromagnetic spectrum. The images captured at varying ranges of the electromagnetic spectrum can vary in intensity at corresponding features, for example due to the differing intensity responses of infrared and visible color sensors to illumination, and accordingly multispectral systems can also include asymmetric sensors. As used herein, a "corresponding feature" refers to the same feature in the actual image scene as depicted in multiple images of an image set. Features can be represented as regions including blocks of pixels at and/or around the feature, and regions depicting corresponding features are referred to herein as "corresponding regions." Variation between intensity values of pixels in corresponding regions is referred to herein as "local intensity variation." Image sets may exhibit local intensity variation at some or all corresponding features of a number of corresponding features in the image set.

Although discussed generally in the context of multisensor systems herein, the local intensity equalization process can also enable accurate region matching between images exhibiting local intensity variations captured by a single sensor. For example, a near-infrared (NIR) image and a visible color (e.g., RGB) image captured by a single RGBN sensor (a four-channel sensor configured to capture RGB and NIR channels of an image scene) can exhibit local intensity variation. As another example, two or more images taken of the same image scene by the same sensor but in different lighting can exhibit local intensity variation. Other sets of images captured by a single sensor and exhibiting local intensity variation are possible. Alignment of any set of images exhibiting local intensity variation can be performed using local intensity equalization.

For alignment and generation of stereoscopic depth maps, matching regions across multiple images requires equal local intensity variation across the images. Image sets generated by asymmetric sensors often do not have equal local intensity, as described above, leading to errors in region matching performance and downstream performance degradation. This and other problems are addressed, in some embodiments, by the local intensity equalization techniques described herein for equalizing pixel block intensity variation in regions surrounding key features identified for region matching. The equalized intensity variation can produce more accurate region matching results compared to non-intensity-matched image sets. For stereoscopic applications, e.g., depth sensing, adaptive intensity matching can reduce matching errors which are manifested as erroneous disparities in areas characterized by the same depth but different contrast. Reducing such errors in the depth map may reduce errors in any downstream processing and enable presentation of a higher quality stereoscopic image compared to stereoscopic images generated from non-intensity-matched image sets.

In comparison to global histogram matching between images, the local intensity equalization techniques described herein enable more accurate region matching through, for example, adaptation to local changes in spatially varying intensity. For example, vignetting, which affects both film and digital cameras, refers to a decrease in the amount of light transmitted by an optical system near the periphery of the lens field-of-view (FOV), resulting in spatially varying intensity of light incident on the image sensor causing gradual darkening of an image at the edges. Further, the illumination of natural image scenes is not constant across the entire scene, resulting in unpredictable spatially varying intensity throughout the scene. Spatially varying intensity poses a significant problem for feature matching between images having different average intensity values, as a global histogram adjustment may not adapt to local changes. For example, global histogram matching approaches are based on average pixel values, and accordingly local regions are biased towards inaccurate intensity values relative to their corresponding region in the input image. The local intensity equalization techniques described herein provide unbiased intensity equalization in local regions, optimizing matching accuracy around keypoint structures in spatially varying illumination. For keypoint matching, which is used for depth map construction in stereoscopic images, local histogram adaptation provides the intensity correspondence between keypoint regions that permits accurate depth map construction.

Accordingly, one aspect relates to an image capture device comprising: a first image sensor having a first intensity response; a second image sensor having a second intensity response; and an image processor configured to: receive image data including a first image from the first image sensor and a second image from the second image sensor, the first image and the second image depicting at least a portion of a single image scene and exhibiting local intensity variation relative to one another, partition the first image into a plurality of first blocks, partition the second image into a plurality of second blocks of pixels, determine a pair of corresponding blocks, the pair of corresponding blocks including an identified first block of the plurality of first blocks and an identified second block of the plurality of second blocks, and generate equalized local intensity values for pixels included in the identified first block and the identified second block Another aspect relates to a method for processing a set of images, the method comprising: receiving image data representing a first image of an image scene; receiving image data representing a second image of at least a portion of the image scene, the second image exhibiting variations in local intensity values relative to local intensity values of the first image; partitioning each of the first image and the second image into a plurality of blocks of pixels; determining a pair of corresponding blocks, the pair of corresponding blocks including a first block of the plurality of blocks of pixels and a second block of the plurality of blocks of pixels, the first block included in the image data representing the first image and the second block included in the image data representing the second image; and generating equalized local intensity values for pixels included in the first block and pixels included in the second block.

Another aspect relates to non-transitory computer-readable medium storing instructions that, when executed, cause an image processor to perform operations comprising: receiving image data representing two or more images captured by asymmetric image sensors; partitioning each of the two or more images into a plurality of blocks of pixels; determining a pair of corresponding blocks, the pair of corresponding blocks including a first block of the plurality of blocks of pixels and a second block of the plurality of blocks of pixels, the first block included in a first image or the two or more images and the second block included in a second image of the two or more images; and generating equalized intensity values for pixels included in the first block and pixels included in the second block.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Introduction

Figure 1:
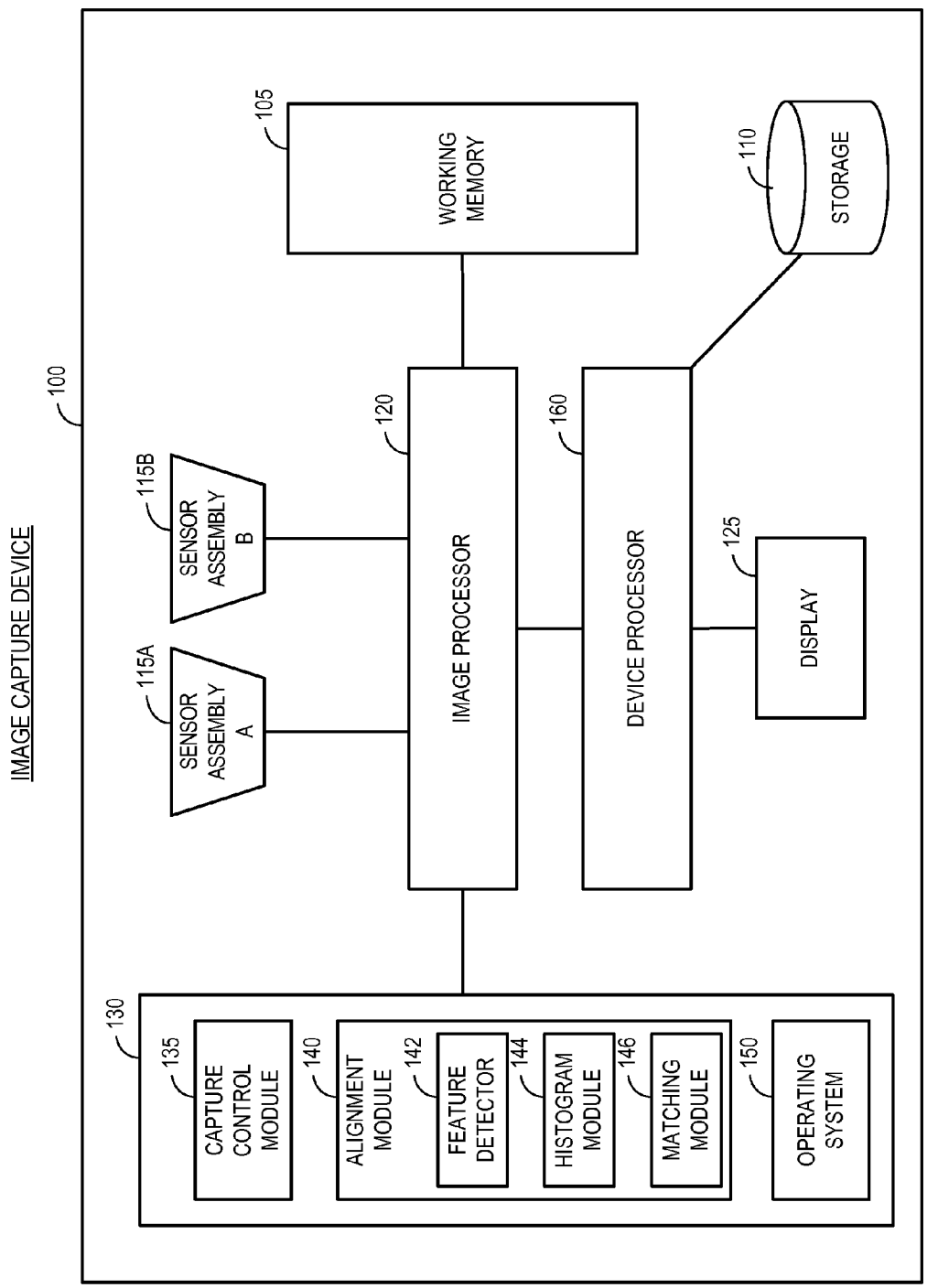
FIG. 1 illustrates a block diagram of one embodiment of an image capture system having local intensity equalization capabilities.

Embodiments of the disclosure relate to systems and techniques for local intensity equalization in region matching for image alignment. Each image in a set of images can each depict substantially the same image scene, for example from different viewpoints, in different lighting, or in different portions of the electromagnetic spectrum. Each of the images in the set can be divided into a number of regions including blocks of pixels. The regions can be matched to determine regions depicting corresponding features between the images, that is, to determine which regions in the images depict the same feature. The regions depicting corresponding features can be matched as to intensity. The intensity correspondence between regions depicting corresponding features can permit accurate matching using the regions, leading, for example, to accurate downstream image alignment and/or depth map construction.

In one embodiment, the regions can be determined at least partly based on identifying distinctive features, referred to as keypoints, in each image in the set of images. Keypoints may be selected and/or processed such that they are invariant to image scale changes and/or rotation and provide robust matching across a substantial range of distortions, changes in point of view, and/or noise. The region location, shape, and size can be determined based, for example, on the location, shape, and size of the extracted features. Intensity equalization between corresponding regions can adapt to local structure content such as the shape of keypoints. Accordingly, the effects of spatially varying intensity on keypoint matching can be mitigated or eliminated by equalizing intensity of corresponding regions after keypoint detection.

Equalization of intensity values between corresponding regions can accommodate the structure of keypoints included in the regions. In some examples, the histogram of each corresponding region can be analyzed to determine spatial intensity variation, and a spatial mapping between the intensities of the corresponding regions can be performed to provide equalized intensity that is adapted to local structure content such as distinctive features. For example, after determining an equalization function based on histogram analysis of the blocks in a pair of images, intensity values in a first image can be mapped to the intensity values in a second image one such that the first image is transformed to have a histogram most closely resembling or matched to a histogram of the second image. All of the determined regions may look very similar in terms of intensity values, and accordingly can be identified by subsequent processing as corresponding regions in each image even though they were produced with different sensors, optics, and/or light wavelengths.

Although aspects of the embodiments described in this disclosure will focus on region matching within the context of stereo image pairs, this is for purposes of illustration and is not intended to limit the use of the local intensity equalization techniques described herein. Alignment using region matching for non-stereo image pairs can be also performed more accurately using the local intensity equalization techniques described herein. For example, local intensity equalization can provide for more accurate multispectral image alignment—matching images from different portions of the spectrum of light—such as aligning a near-infrared (NIR) image and a visible color (e.g., RGB) image captured of the same image scene. Local intensity equalization can also provide more accurate spectroscopic image alignment, for example for aligning sets of images taken at different wavelengths by optical systems using diffraction grating to perform spectroscopy. The local intensity equalization techniques described herein can be used to align a pair of images or a set of three or more images in various embodiments. Further, the local intensity equalization techniques described herein are not limited to alignment by region matching, and can be incorporated into any image alignment or rectification technique.

Various aspects of the disclosure will now be described with regard to certain examples and embodiments, which are intended to illustrate but not limit the disclosure.

Overview of Example System

FIG. 1 illustrates a block diagram of one embodiment of an image capture device (or system) 100 having intensity equalization capabilities. Device 100 includes an image processor (or processor) 120 linked to image sensor assemblies 115A and 115B, working memory 105, storage 110, display 125, and a memory 130.

Device 100 may be a cell phone, digital camera, tablet computer, personal digital assistant, or the like. There are many imaging devices having asymmetric image sensors in which a local intensity equalization process such as is described herein would provide advantages. A plurality of imaging applications may be available to the user on device 100. These applications may include traditional photographic and video applications, high dynamic range imaging, panoramic photo and video, stereoscopic imaging such as 3D images or 3D video, or multispectral imaging, to name a few.

The image capture device 100 as illustrated includes the image sensor assemblies 115A, 115B for capturing external images. The image sensor assemblies 115A, 115B may each include a sensor, lens assembly, and autofocus module. The sensors of assemblies 115A and 115B may be charge coupled devices (CCD) or complementary metal oxide semiconductors (CMOS) in some embodiments. The sensors of assemblies 115A and 115B may be asymmetric sensors configured to have varying responses to intensity of light incoming from features of the image scene. Thus, the target image scene may be captured as a set of images in which sensor assembly 115A captures image A according to the sensor's intensity response and sensor assembly 115B captures image B according to the sensor's intensity response. Although two image sensor assemblies 115A, 115B are shown, this is for purposes of illustration and is not intended to limit the type of system which can implement the intensity equalization techniques described herein. In other embodiments, three or more sensor assemblies can capture a set of images of a target scene, the set of images exhibiting at least some local intensity variation. In still other embodiments, a single sensor assembly can capture a set of images of a target scene, the set of images exhibiting at least some local intensity variation. In some embodiments, one or more of the sensor assemblies may not be part of the device 100, instead information from one or more sensor assemblies is provided to the device 100 for processing. For example, the sensor assemblies may be part of another imaging system, and information from such a system may be provided to be processed using functionality described for the device 100. In some embodiments, such information is first stored, and then provided to the device 100 for processing. The number of sensor assemblies may be increased or decreased according to the needs of the imaging system 100. The image sensor assemblies 115A, 115B may be coupled to the image processor 120 to transmit captured images to the image processor 120.

The image processor 120 may be configured to perform various processing operations on received image data including a number of images of the image scene in order to output an accurately aligned image set, as will be described in more detail below. Processor 120 may be a general purpose processing unit or a processor specially designed for imaging applications. Examples of image processing operations include cropping, scaling (e.g., to a different resolution), image stitching, image format conversion, color interpolation, color processing, image filtering (e.g., spatial image filtering), lens artifact or defect correction, etc. Processor 120 may, in some embodiments, comprise a plurality of processors. Certain embodiments may have a processor dedicated to each image sensor. Processor 120 may be one or more dedicated image signal processors (ISPs) or a software implementation of a processor.

Image processor 120 is connected to a memory 130 and a working memory 105. In the illustrated embodiment, the memory 130 stores capture control module 135, alignment module 140, and operating system 150. These modules include instructions that configure the image processor 120 and/or device processor 160 to perform various image processing and device management tasks. Working memory 105 may be used by image processor 120 to store a working set of processor instructions contained in the modules of memory 130. Alternatively, working memory 105 may also be used by image processor 120 to store dynamic data created during the operation of device 100.

As described above, the image processor 120 is configured by several modules stored in the memories, for example, memory 130. The capture control module 135 may include instructions that configure the image processor 120 to adjust the focus position of imaging sensor assemblies 115A, 115B. Capture control module 135 may further include instructions that control the overall image capture functions of the device 100. For example, capture control module 135 may include instructions that call subroutines to configure the image processor 120 to capture raw image data of a target image scene using the imaging sensor assemblies 115A, 115B. Capture control module 135 may then call the alignment module 140 to perform local intensity equalization and alignment on the images captured by the sensor assemblies 115A, 115B and to output aligned image data to imaging processor 120. Capture control module 135 may also call the alignment module 140 to perform intensity equalization and alignment on raw image data in order to output a preview image on display 125 of a scene to be captured in some embodiments, and to update the preview image at certain time intervals or when the scene in the raw image data changes.

Alignment module 140 may include instructions that configure the image processor 120 to perform image alignment using local intensity equalization techniques on captured image data. For example, each of the sensor assemblies 115A, 115B may capture an image depicting the target image according to each sensor's intensity response. As discussed above, the intensity responses may differ due to discrepancies in sensor gains, roll-offs, sensitivity, field of view, white balance, geometric distortion, and noise sensitivities, among other things, differences between the lenses in sensor assemblies 115A, 115B, and on-board image signal conditioning. In order to perform accurate alignment of the images despite local intensity variations between the images, alignment module 140 may configure the image processor 120 to partition the images into a number of regions, equalize local intensity values of corresponding regions, and perform region matching using the intensity-equalized regions.

For instance, alignment module 140 can include feature detector 142 including instructions that configure the image processor 120 to detect distinctive features, or keypoints, in the image data. Such features can correspond to points in the images that can be matched with a high degree of accuracy. For example, distinctive features may be characterized at least partly by the presence or sharpness of edges or lines, corners, ridges, or blobs differing in properties, for example, size, shape, dimension, brightness or color compared to surrounding pixel regions. Generally, object or feature recognition may involve identifying points of interest (also called keypoints) in an image and/or localized features around those keypoints for the purpose of feature identification. An object or feature may be characterized by descriptors identifying one or more keypoints. Keypoints can be identified by any known feature detection technique, e.g., sum of squared differences, Laplacian of Gaussian (LoG), difference of Gaussian (DoG), and determinant of the Hessian (DoH), to name a few.

Feature detector 142 can also include instructions that configure the image processor 120 to partition the image data into regions including pixel blocks based at least partly on the identified keypoints. The pixel block location, shape, and size can be determined based, for example, on the location, shape, and size of the identified keypoints. In some embodiments such as some stereoscopic alignment applications, the feature detector 142 can include instructions that configure the image processor 120 to limit pixel block size to larger than a disparity value and/or smaller than a roll-off variation value.

Alignment module 140 can also include histogram module 144, which includes instructions that configure the processor 120 to generate and analyze histograms of the regions and generate an intensity equalization function based at least partly on the histogram analysis. Histogram module 144 can include instructions that configure the processor 120 to determine the probability mass function (PMF) of each block, to sum the mass in the PMF to compute the cumulative mass function (CMF), and to use the CMF to map intensity values from pixels in the image captured by sensor assembly 115A to pixels in the image captured by sensor assembly 115B (or vice versa). Accordingly, the intensity equalization between corresponding regions can adapt to local structure content such as the shape of keypoints.

Alignment module 140 can also include matching module 146, which includes instructions that configure the processor 120 to perform region matching using the intensity-equalized image data generated by the histogram module 144. Due to the local adaptive intensity equalization, the corresponding keypoint regions may look very similar to one another in terms of intensity values, enabling highly accurate matching around the keypoint structures, even in images exhibiting spatially varying intensity.

Operating system module 150 configures the image processor 120 to manage the working memory 105 and the processing resources of device 100. For example, operating system module 145 may include device drivers to manage hardware resources such as the imaging sensor assemblies 115A, 115B. Therefore, in some embodiments, instructions contained in the image processing modules discussed above may not interact with these hardware resources directly, but instead interact through standard subroutines or APIs located in operating system component 150. Instructions within operating system 150 may then interact directly with these hardware components. Operating system module 150 may further configure the image processor 120 to share information with device processor 160.

Device processor 160 may be configured to control the display 125 to display the captured image, or a preview of the captured image, to a user. The display 125 may be external to the imaging device 100 or may be part of the imaging device 100. The display 125 may also be configured to provide a view finder displaying a preview image for a use prior to capturing an image, or may be configured to display a captured image stored in memory or recently captured by the user. The display 125 may comprise an LCD or LED screen, and may implement touch sensitive technologies.

Device processor 160 may write data to storage module 110, for example data representing captured images, image alignment data, intensity value data, and the like. While storage module 110 is represented graphically as a traditional disk device, those with skill in the art would understand that the storage module 110 may be configured as any storage media device. For example, the storage module 110 may include a disk drive, such as a floppy disk drive, hard disk drive, optical disk drive or magneto-optical disk drive, or a solid state memory such as a FLASH memory, RAM, ROM, and/or EEPROM. The storage module 110 can also include multiple memory units, and any one of the memory units may be configured to be within the image capture device 100, or may be external to the image capture device 100. For example, the storage module 110 may include a ROM memory containing system program instructions stored within the image capture device 100. The storage module 110 may also include memory cards or high speed memories configured to store captured images which may be removable from the camera.

Although FIG. 1 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance. Additionally, although FIG. 1 illustrates two memory components, including memory component 130 including several modules and a separate working memory 105, other embodiments may utilize different memory architectures. For example, a design may utilize ROM or static RAM memory for the storage of processor instructions implementing the modules contained in memory 130. The processor instructions may be loaded into RAM to facilitate execution by the image processor 120. For example, working memory 105 may comprise RAM memory, with instructions loaded into working memory 105 before execution by the processor 120.

Overview of Example Stereo Image Generation Using Local Intensity Equalization

Figure 2:
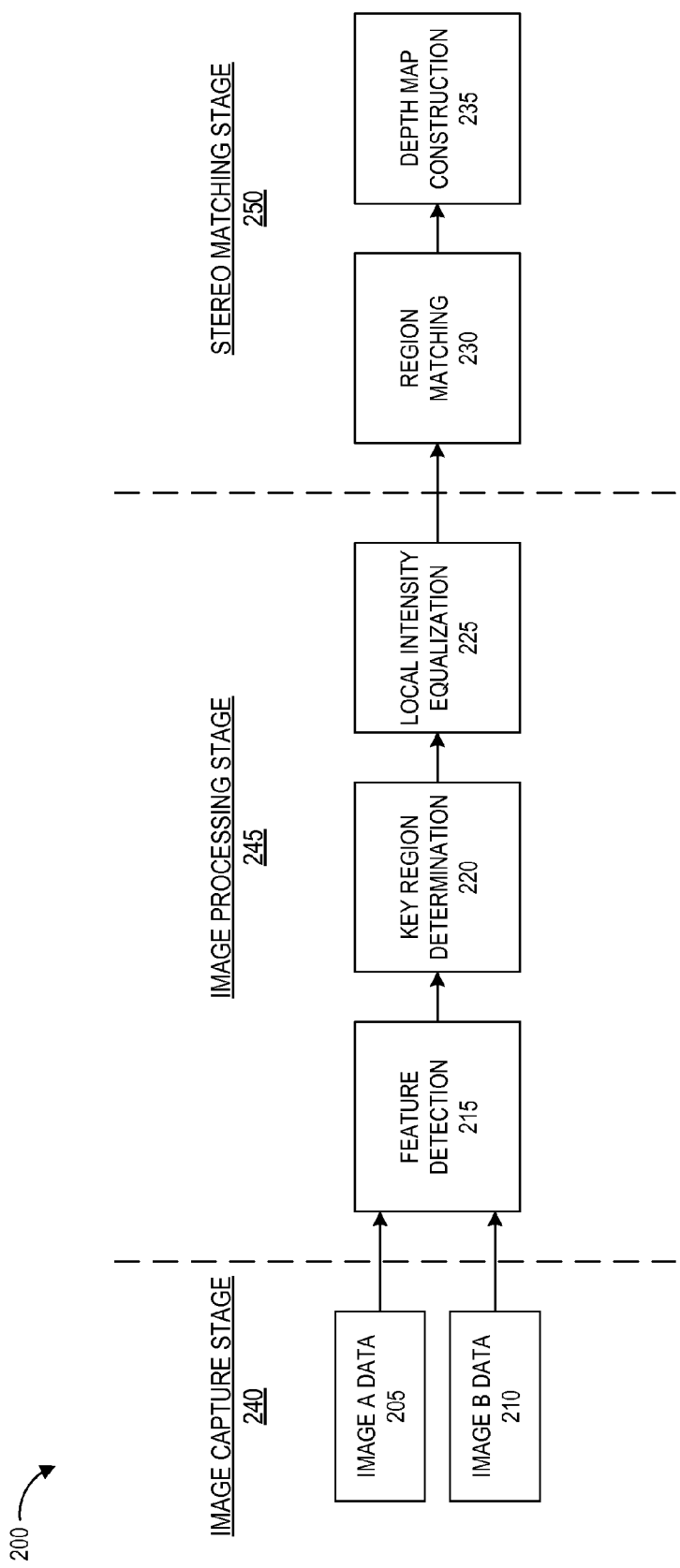
FIG. 2 illustrates a block diagram of an embodiment of stages for generating a stereo image using local intensity equalization.

FIG. 2 illustrates a block diagram of an embodiment of modules that can be used to execute stages for generating a stereo image using local intensity equalization including image capture stage 240, image processing stage 245, and stereo matching stage 250.

At image capture stage 240, image data A 205 and image data B 210 may depict image information captured of a single image scene (for example, the same or a portion of a single image scene taken at the same time, or at a different time), or of at least some overlapping portions of an image scene (taken at the same time or at a different time). Each of image data A 205 and image data B 210 includes information associated with the pixels that are included in the image, for example, an intensity or brightness value (or measured signal) of the pixels as sensed by the imaging system. In some embodiments, a pixel in the image data A and/or B may also have other information relating to the pixel associated with it, for example, information relating to color or another image characteristic.

As discussed above, image data A 205 and image data B 210 may be captured using asymmetric sensors or by a single sensor with varying illumination, resulting in local intensity variations at keypoint features in the images. Image data A 205 and image data B 210 may be taken from slightly different viewpoints and used to construct a stereoscopic image in one embodiment. In another embodiment, image data A 205 and image data B 210 may be from different portions of the light spectrum and used to construct a multispectral image or for other multispectral imaging applications.

At image processing stage 245, the captured image data A 205 and image data B 210 can be processed using local intensity equalization to enable accurate region matching at keypoint features in the image data. For example, image processing stage 245 can implement feature detection module 215 which is configured (or includes instructions) to determine distinctive features for keypoints. Distinctive features can be extracted from each of image data A 205 and image data B 210. Such features can correspond to points in the images that can be matched with a high degree of accuracy. For example, distinctive features may be characterized at least partly by the presence of edges or lines, corners, ridges, or blobs differing in properties including but not limited to size, shape, dimension, brightness or color compared to surrounding pixel regions. As discussed above, such keypoint features can be identified by any known feature detection technique, for example, sum of squared differences, Laplacian of Gaussian (LoG), difference of Gaussian (DoG), and determinant of the Hessian (DoH), to name a few.

The image processing stage 245 can also implement a key region determination module 220 which is configured (or includes instructions) to partition image data A 205 and image data B 210 into regions comprising pixel blocks based on the identified keypoints. The region size may be determined from the optical and imaging parameters of the respective image capturing systems. The block size can be small enough to capture local variations and encompass keypoint features and large enough to sufficiently sample the local intensity probability density functions. In some embodiments, dividing an image into 4, 8, and 16 blocks can result in good performance of region matching using the equalized blocks. Some embodiments can adaptively size blocks based on keypoint features, and may achieve performance gains in region matching using the intensity-equalized and adaptively sized blocks. For example, the pixel block location, shape, and size can be determined based on the location, shape, and size of the identified keypoints. In some embodiments such as some stereoscopic alignment applications, pixel block size can be within a range of larger than a disparity value and smaller than a roll-off variation value. Key region determination module 220 can also be used to determine a general correspondence between regions of image data A 205 and image data B 210 in order to identify pairs of pixel blocks depicting the same keypoint feature.

Image processing stage 245 can also implement a local intensity equalization module 225 which is configured (or includes instructions) to generate and analyze histograms of each of the regions. The local intensity equalization module 225 can generate an intensity equalization function for a pair of corresponding regions in image data A and image data B, for example based at least partly on the histogram analysis. In one embodiment, to equalize local intensity, the probability mass function (PMF) of each block can be determined, the mass in the PMF can be summed to compute the cumulative mass function (CMF), and the CMF can be used to map intensity values from pixels in a first image to pixels in a second image. Accordingly, the intensity equalization between corresponding regions accounts for as the intensity structure of keypoints within the regions.

Stereo matching stage 250 illustrates one embodiment of a stereoscopic depth map construction using data generated by adaptive local intensity equalization to align the images using region matching and construct a depth map using the corresponding keypoints. At region matching module 230, the intensity equalized image data A and image data B can be used to determine corresponding pixels at keypoints between image data A and image data B. Because the features can appear in different locations, orientations, and scale, the intensity-matched region data is used to determine an accurate geometric translation between corresponding keypoints. Depth map construction module 235 can determine a depth level of each pixel based on a disparity value determined based on a distance between locations of corresponding keypoints in the images. For example, a geometric translation between a keypoint in image data A and a corresponding keypoint in image data B can be estimated using the matched keypoints and can be used to determine depth values for the pixels representing the keypoint. Although not illustrated, some embodiments of stereoscopic image generation can use the intensity-equalized images may be used to produce the stereoscopic image using the constructed depth map. In other embodiments, the original images may be used to produce the stereoscopic image using the constructed depth map.

Overview of Example Equalization Module

Figure 3:
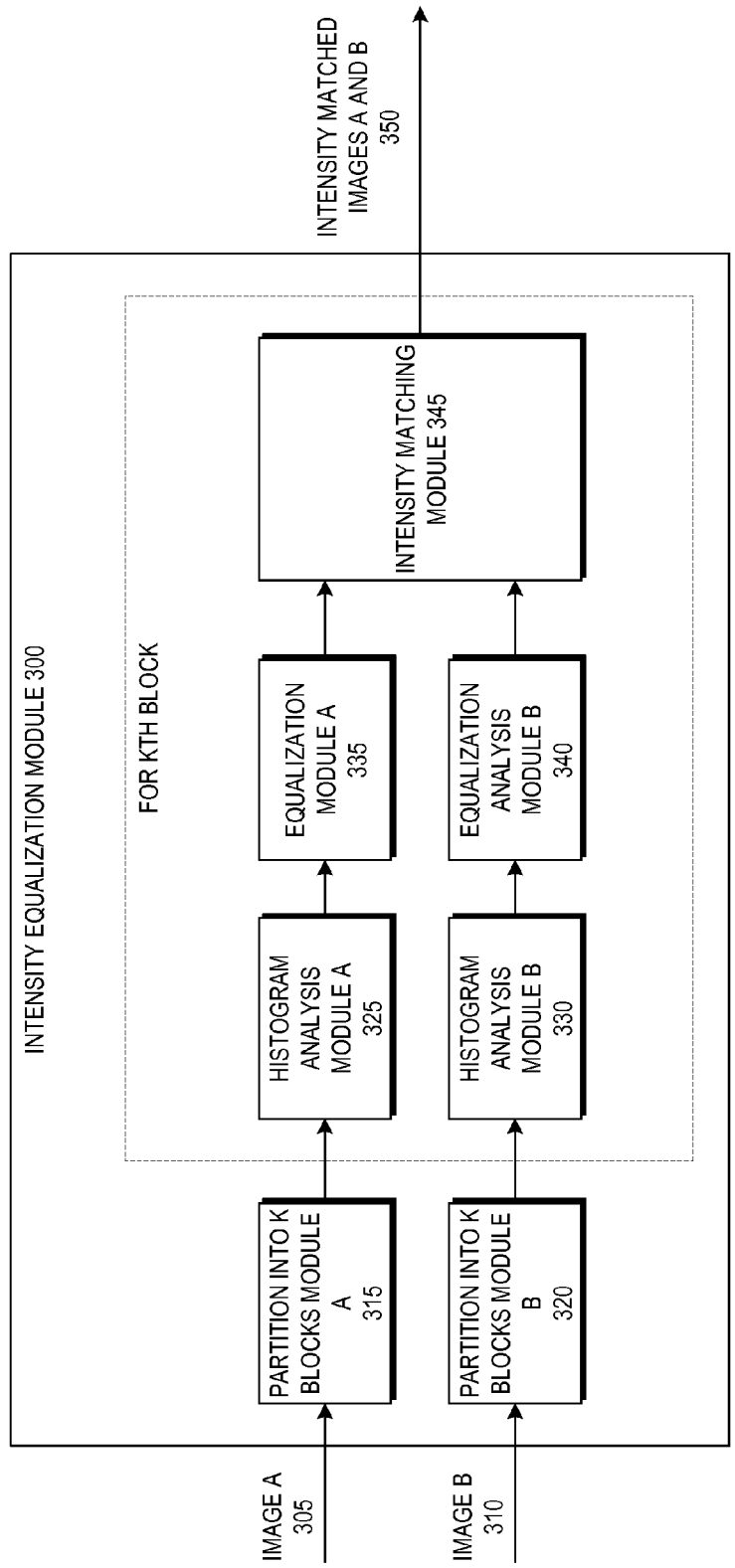
FIG. 3 illustrates a block diagram of an embodiment of an equalization module.

FIG. 3 illustrates a block diagram of an embodiment of an equalization module 300 that can be used to perform the local intensity equalization techniques discussed herein on image data including two or more images. In some embodiments, equalization module 300 can be incorporated into the histogram module 144 of device 100 described above.

In the illustrated embodiment, data representing image A 305 can be received from a first image sensor and data representing image B 310 can be received from a second image sensor, where the first image sensor and the second image sensor are asymmetric. Accordingly, image A 305 and image B 310 can have variations in local intensity values, for example pixel intensity values at and around keypoint features. Although the depicted embodiment is implemented to equalize the local intensity values of two images, three or more images can be sent to the equalization module 300 in other embodiments. In some embodiments of equalizing intensity between three or more images, one image can be identified as a reference for matching the intensity values of the other images to the intensity values of the reference image. In some embodiments, the first image sensor and the second image sensor are not asymmetric.

Image A can be received at partition module A 315 to be partitioned into K regions of pixel blocks. Image B can be received at partition module B 320 to be partitioned into the same number K regions of pixel blocks. As discussed above, the number, size, location, and shape of the pixel blocks can be based in some embodiments on identification of keypoints in image A and image B. In some embodiments the images can be partitioned according to a predetermined block number and configuration.

Partitioned image data A can be received at histogram analysis module A 325 and partitioned image data B can be received at histogram analysis module B 330. Though depicted as separate modules, in some embodiments histogram analysis module A and histogram analysis module B can be implemented as a single module. For each block of K blocks in each of images A and B, histogram analysis module A and histogram analysis module B can compute $$h_i(j) = \frac{n_j}{N}$$

for values of i from 1 to K and for j=0,1 . . . 255 which is the number of values for level j divided by the total number of elements per block N. Accordingly, $h_i$ is the probability mass function (PMF) of the block. This indicates the likelihood of level j occurring in the block which gives information on the spatial structure content in the region.

Equalization function $H_1$ can be determined by equalization module A 335 for the histogram output by histogram analysis module A 325. For example, equalization module A 335 can sum the mass in the PMF according to:

$$H_1(j) = \sum_{i=0}^{j} h_2(i)$$

in order to compute the cumulative mass function (CMF). Equalization module B 340 can compute a similar function $H_2$ for the histogram output by histogram analysis module B 330. The CMF can indicate how the spatial intensity values change within a block, for example due to keypoint feature structures.

Intensity matching module 345 can perform a spatial mapping between the intensities of image A and image B based on the cumulative mass functions determined by the equalization modules A and B. In some embodiments, the equalization function can be applied according to:

$$\min_{j \in [0,255]} |H_1(i) - H_2(j)|$$

once the CMFs for all blocks and all sensors have been determined. This can map the intensity values in image B to the intensity values in image A such that image B is transformed to have a histogram closely resembling or matched to a histogram of image A. As a result, the regions may look very similar and can be identified by subsequent processing as corresponding regions in each image even though they were produced with asymmetric sensors. The resulting intensity matched images A and B can be representing according to:

$$\hat{J}_k = H_2^{-1}(H_1(i))$$

In some embodiments, in order to determine new intensity values for the pixels of image B, the matching module can perform bilinear histogram interpolation. For example, for each pixel, four new luma values can be determined by table lookup from loaded histograms. The new luma value for the target pixel may then be determined by a suitable interpolation technique, for example bilinearly, in order generate an equalized pixel value from neighboring histogram information.

Overview of Example Local Intensity Equalization Process

Figure 4:
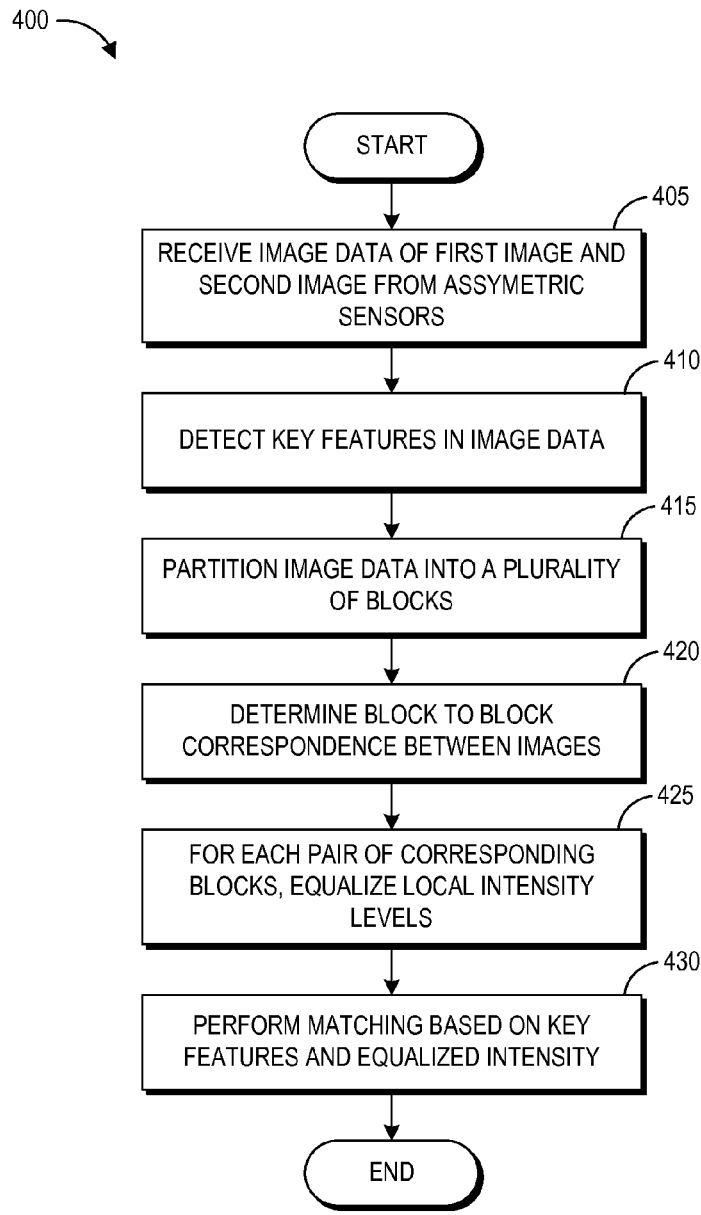
FIG. 4 illustrates an embodiment of a local intensity equalization process.

FIG. 4 illustrates an embodiment of a local intensity equalization process 400. In some embodiments, blocks 405-425 of process 400 can be executed by equalization module 300 or the histogram module 144 of device 100 described above. Matching module 146 can be used in some embodiments to perform block 430 of the process 400.

At block 405, the equalization module 300 can receive image data of at least a first image and a second image captured by asymmetric sensors. Accordingly, the first image and second image may exhibit local intensity variations at or around keypoint regions, among other locations.

At block 410, partition modules A and B (and, in some embodiments, additional partition modules not illustrated corresponding to third, fourth, or more images) can identify keypoints in the first and second images corresponding to structures that can be accurately matched. Keypoints may be characterized at least partly by the presence of edges or lines, corners, ridges, or blobs differing in properties such as brightness or color compared to surrounding pixel regions. However, due to local intensity variation, the intensity values at corresponding keypoint features in the first and second images can be different.

At block 415, partition modules A and B can partition the first image and the second image into a number of regions including pixel blocks. In some embodiments, the first image and the second image can be partitioned into equal numbers of blocks. The pixel block number, location, size, and shape can be based at least partly on the keypoints identified at block 410 in some embodiments.

At block 420, partition modules A 315 and B 320 (FIG. 3) can determine a block to block correspondence between the first and second images. The block to block correspondence can indicate generally that a pair of blocks, with one block in the pair included in the first image and one block in the pair included in the second image, depict the same keypoint feature from the target image scene. The block to block correspondence can enable local intensity analysis and equalization around keypoint features.

At block 425, the equalization module 300 can equalize the local intensity values for the pixels in some or all of the blocks in the first and second image. For example, as discussed above, histogram modules A 325 and B 330 can compute the PMF for each block in both the first image and the second image. Equalization modules A 335 and B 340 can compute an equalization function by summing the mass in the PMF to calculate the CMF. Using the CMF functions for each pair of corresponding blocks, the intensity matching module 345 can perform bilinear interpolation to map intensity values of the second image to match or approximate intensity values of the first image in while preserving the structure of keypoint features.

At block 430, matching module 146 can receive the data of the first and second images with adaptive local intensity equalization applied to the image data. Matching module 146 can use this data to perform region matching and to determine correspondences and translations between pixels in the keypoint features.

Example Result Comparison

Figure 5A:
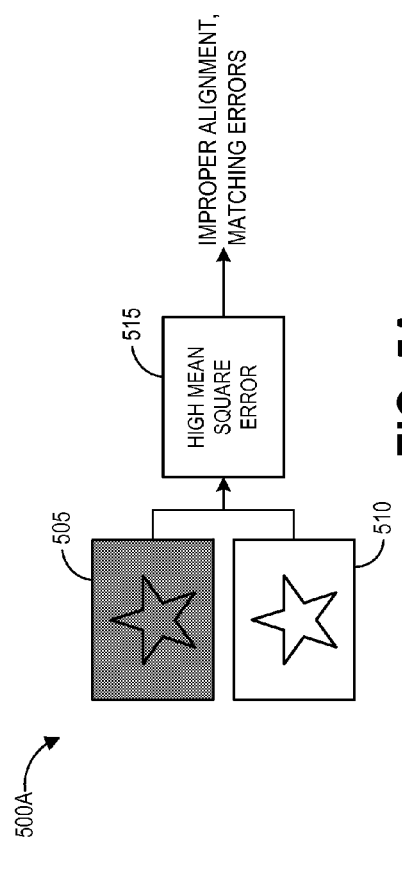
FIGS. 5A and 5B illustrate block diagrams depicting a comparison of mean square error results of conventional region matching and region matching including an embodiment of a local intensity equalization process.
Figure 5B:
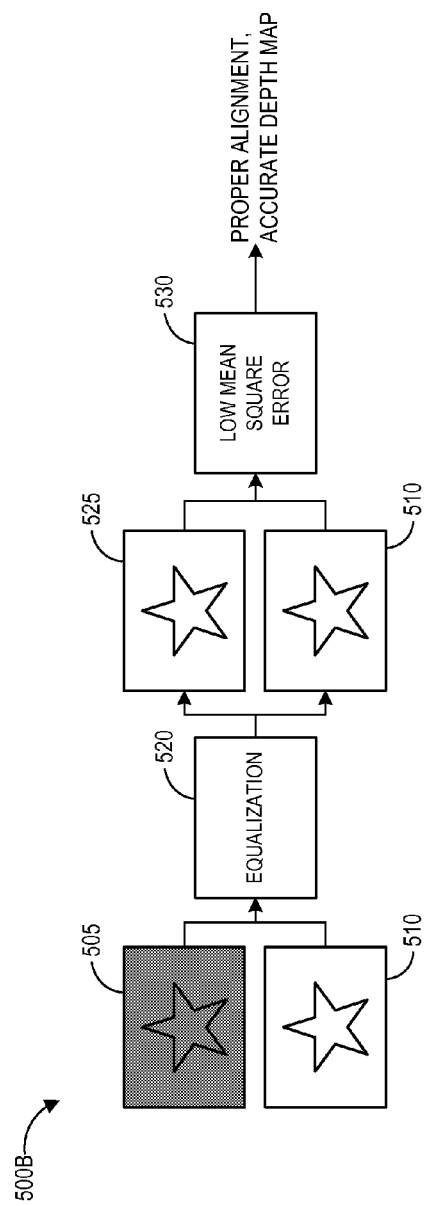

FIGS. 5A and 5B illustrate a comparison of mean square error results of conventional region matching and region matching including an embodiment of a local intensity equalization process.

FIG. 5A represents a conventional approach to region matching between a first image 505 and a second image 510 that are not matched as to local intensity values. Such an approach can produce a high mean square error 515. For example, correspondences between keypoints in the images 505, 510 can be based on determining a minimum mean square error of the intensity distribution. Due to the mismatched local intensity values around keypoints, the minimum mean square error can be high enough to cause improper or inaccurate alignment between the images 505, 510 due to matching errors. This can lead to inaccurate depth maps, low visual quality aligned or stereoscopic images, and other undesirable downstream processing effects.

FIG. 5B represents the equalized approach to region matching described herein, in which the first image 505 and a second image 510 undergo local intensity equalization processing at block 520. As a result, the first image 505 is transformed into an intensity-equalized image 525 having a histogram matching or substantially corresponding to the histogram of the second image 510 in some embodiments. This can produce a low mean square error 530, leading to proper alignment between keypoint features and, in stereoscopic applications, construction of an accurate depth map.

Implementing Systems and Terminology

Implementations disclosed herein provide systems, methods and apparatus for local intensity equalization in region matching techniques. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, one or more image signal processors, and a memory including instructions or modules for carrying out the local intensity equalization techniques discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An image capture device comprising:
    a first image sensor;
    a second image sensor; and
    an image processor configured to:
        receive image data including a first image from the first image sensor and a second image from the second image sensor, the first image and the second image depicting at least a portion of an image scene and exhibiting local intensity variation relative to one another,
        partition the first image into a plurality of first blocks of pixels,
        partition the second image into a plurality of second blocks of pixels,
        determine a pair of corresponding blocks, the pair of corresponding blocks including an identified first block of the plurality of first blocks and an identified second block of the plurality of second blocks, and
        generate equalized local intensity values for pixels included in the identified first block of the first image and the identified second block of the second image, including mapping intensity values of pixels in the first block to intensity values of pixels in the second-block such that a histogram of the intensity values of pixels of the first block are transformed to more closely resemble a histogram of the intensity values of the pixels of the second block.

2. The device of claim 1, wherein the first image sensor has a first intensity response and wherein the second image sensor has a second intensity response, wherein the first intensity response is different from the second intensity response.

3. The device of claim 1, wherein the first image and the second image exhibiting the local intensity variation is based at least partly on the first image comprising a NIR image and the second image comprising a RGB image.

4. The device of claim 1, wherein the first image and the second image exhibiting the local intensity variation is based at least partly on a first lighting condition of the image scene during capture of the first image being different from a second lighting condition of the image scene during capture of the second image.

5. The device of claim 1, further comprising a matching module including instructions that configure the image processor to perform region matching based at least partly on the equalized local intensity values for the pixels included in the identified first block and the identified second block.

6. The device of claim 5, further comprising a depth map construction module including instructions that configure the image processor to generate a depth map based at least partly on a result of the region matching.

7. The device of claim 1, further comprising a feature detection module including instructions that configure the image processor to identify a plurality of keypoints in the first image and to identify a plurality of keypoints in the second image.

8. The device of claim 7, further comprising a key region determination module including instructions that configure the image processor to partition the first image based at least partly on the plurality of keypoints in the first image and to partition the second image based at least partly on the plurality of keypoints in the second image.

9. The device of claim 1, wherein the first image sensor and the second image sensor are configured as at least a portion of one of a stereoscopic imaging system or multi-spectral imaging system.

10. A method for processing a set of images, the method comprising:
receiving image data representing a first image of an image scene;
receiving image data representing a second image of at least a portion of the image scene, the second image exhibiting variations in local intensity values relative to local intensity values of the first image;
partitioning each of the first image and the second image into a plurality of blocks of pixels;
determining a pair of corresponding blocks, the pair of corresponding blocks including a first block of the plurality of blocks of pixels and a second block of the plurality of blocks of pixels, the first block included in the image data representing the first image and the second block included in the image data representing the second image; and
generating equalized local intensity values for pixels included in the first block of the first image and pixels included in the second block of the second image comprising generating a mapping of intensity values of pixels in the first block to intensity values of pixels in the second block such that a histogram of the intensity values of pixels of the first block are transformed to more closely resemble a histogram of the intensity values of the pixels of the second block.

11. The method of claim 10, further comprising receiving the first image and the second image from a pair of asymmetric sensors.

12. The method of claim 10, further comprising receiving the first image from a NIR image sensor and receiving the second image from a RGB image sensor.

13. The method of claim 10, wherein generating equalized local intensity values comprises determining a probability mass function for each of the first block and the second block.

14. The method of claim 13, wherein generating equalized local intensity values comprises summing mass values in the probability mass function for each of the first block and the second block to compute a cumulative mass function for each of the first block and the second block.

15. The method of claim 14, wherein generating equalized local intensity values comprises using the computed cumulative mass function for each of the first block and the second block to generate the mapping of intensity values of pixels in the first block to intensity values of pixels in the second block.

16. The method of claim 15, wherein generating equalized local intensity values further comprises performing bilinear interpolation on the mapping of the intensity values to generate a new luma value for each of the pixels in the first block.

17. The method of claim 10, further comprising identifying a plurality of keypoints in each of the first image and the second image.

18. The method of claim 17, wherein partitioning each of the first image and the second image into a plurality of blocks of pixel is based at least partly on one or more of a location, size, shape, and number of the plurality of keypoints.

19. The method of claim 18, wherein determining the pair of corresponding blocks comprises determining that the first block and the second block depict the same keypoint of the plurality of keypoints.

20. The method of claim 10, further comprising performing region matching based at least partly on the equalized local intensity values.

21. The method of claim 20, further comprising constructing a depth map based at least partly on a result of the region matching.

22. Non-transitory computer-readable medium storing instructions that, when executed, cause an image processor to perform operations comprising:
receiving image data representing two or more images captured by a first image sensor and a second image sensor;
partitioning each of the two or more images into a plurality of blocks of pixels;
determining a pair of corresponding blocks, the pair of corresponding blocks including a first block of the plurality of blocks of pixels and a second block of the plurality of blocks of pixels, the first block included in a first image or the two or more images and the second block included in a second image of the two or more images; and
generating equalized intensity values for pixels included in the first block of the first image and pixels included in the second block of the second image, including mapping intensity values of pixels in the first block to intensity values of pixels in the second block such that a histogram of the intensity values of pixels of the first block are transformed to more closely resemble a histogram of the intensity values of the pixels of the second block.

23. The non-transitory computer-readable medium of claim 22, the operations further comprising identifying a plurality of keypoints in each of the first image and the second image.

24. The non-transitory computer-readable medium of claim 22, the operations further comprising performing region matching based at least partly on the equalized intensity values.

25. The non-transitory computer-readable medium of claim 24, the operations further comprising constructing a stereoscopic depth map based at least partly on a result of the region matching.

26. An imaging apparatus comprising:
means for receiving image data representing a first image of an image scene;
means for receiving image data representing a second image of at least a portion of the image scene, the second image exhibiting variations in local intensity values relative to local intensity values of the first image;
means for partitioning each of the first image and the second image into a plurality of blocks of pixels;
means for determining a pair of corresponding blocks, the pair of corresponding blocks including a first block of the plurality of blocks of pixels and a second block of the plurality of blocks of pixels, the first block included in the image data representing the first image and the second block included in the image data representing the second image; and
means for generating equalized local intensity values for pixels included in the first block and pixels included in the second block, the means for generating equalized local intensity values comprising means for generating a mapping of intensity values of pixels in the first block to intensity values of pixels in the second block such that a histogram of the intensity values of pixels of the first block are transformed to more closely resemble a histogram of the intensity values of the pixels of the second block.

27. The apparatus of claim 26, wherein the means for receiving image data representing the first image comprises a NIR sensor and the means for receiving image data representing the second image comprises a RGB sensor.

28. The apparatus of claim 26, wherein the means for receiving image data representing the first image and the means for receiving image data representing the second image comprises a pair of asymmetric image sensors.

29. The apparatus of claim 26, wherein the means for receiving image data representing the first image and the means for receiving image data representing the second image comprises a single image sensor.

30. The apparatus of claim 29, wherein the single image sensor captures the first image and the second image under different lighting conditions.

\* \* \* \* \*